April 3, 1951  S. H. HOLMES  2,547,211
WORK STOP

Filed Jan. 9, 1946  2 Sheets—Sheet 1

Inventor:—
Stanley H. Holmes
By [signature]
Attorney

April 3, 1951 S. H. HOLMES 2,547,211
WORK STOP
Filed Jan. 9, 1946 2 Sheets-Sheet 2

Inventor:-
Stanley H. Holmes.
By
Attorney.

Patented Apr. 3, 1951

2,547,211

UNITED STATES PATENT OFFICE 2,547,211

WORK STOP

Stanley H. Holmes, Chicago, Ill.

Application January 9, 1946, Serial No. 639,985

3 Claims. (Cl. 90—59)

This invention pertains to machine shop accessories and has for its principal object the provision of a work stop for use on machine work beds and tables to maintain the worked material in position for various operations such as planing, grinding, drilling, etc.

It is a further and more particular object of the invention to provide a novel work stop adapted to fit into a socket on the work bed or table, and having work-engaging portions so disposed as to transform efforts of the work to move on the bed or table into a thrust downwardly upon the bed or table, whereby to more effectively stabilize the work.

Still more specifically, it is an object of the invention to provide a work stop having a shank adapted to fit into a socket on a work bed; to provide a head on the shank disposed above the bed surface; to provide a work-engaging member which is movably carried on said head and free to move back and forth in a plane which is normal to said surface and having further a portion projecting into space to be engaged by the work; to dispose said head and work-engaging member at a level above said surface of the work bed or table so that the work will be engaged at a level below the horizontal center line thereof, whereby efforts of the work to shift or creep in a horizontal sense on said surface will be transformed into a downward thrust tending to stabilize the work in position on the bed; to provide means for automatically locating or disposing the work-engaging member in position for engagement with the work; to provide a simplified construction which is economical to manufacture, easy to use, and ruggedly reliable in its operation.

Additional objects and aspects of novelty relate to details of construction and operation of the illustrative embodiments described hereinafter in view of the annexed drawings in which.

Figure 1:
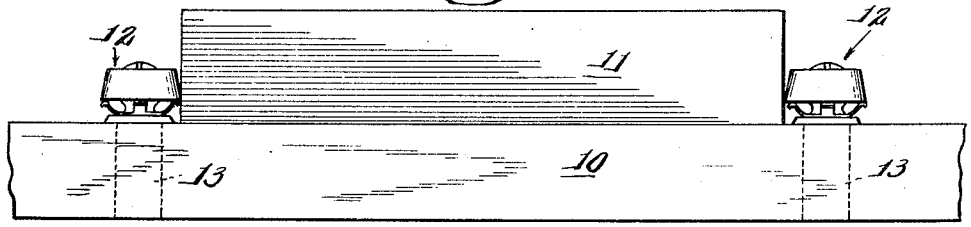
Fig. 1 is an elevational view of a fragment of a work bed with the work and the novel stops disposed thereon.
Figure 2:
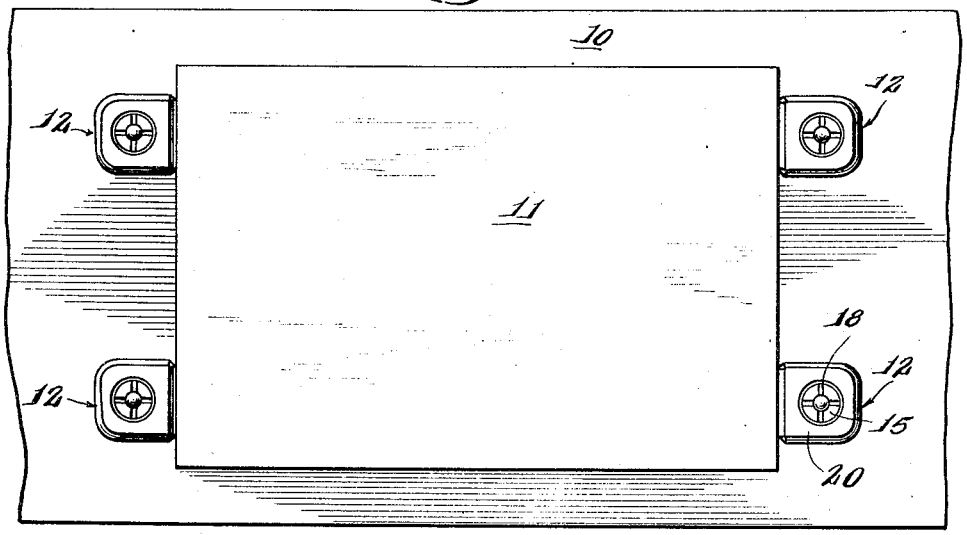
Fig. 2 is a top plan view of the same.

In Fig. 1 is shown the work table or bed 10 of a planer or the like, upon which is disposed a block 11 of metal with a plurality of the novel stops 12 flanking said block to hold the same in position while being worked upon, said stops having shank portions 13 received in vertical bores or sockets in the bed 10; any desired or necessary number of stops may be used as required by various jobs, four such stops being employed in the illustration of Fig. 2.

Figures 3, 4:
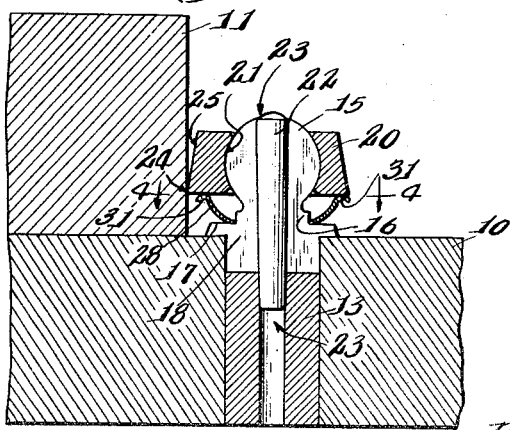
Fig. 3 is a vertical sectional detail, to enlarged scale, of one form of the stop in operative condition.
Fig. 4 is a horizontal section in the direction of lines 4—4 of Fig. 3.

As shown in the sectional view of Fig. 3, each stop has an enlarged, bulbous, rotund, rondular or spheroidal head 15 disposed above an integral collar portion 16 adjoining a seating flange or shoulder 17 on shank 13. Formed in said head 15 are a plurality of radially disposed slots or cuts 18 extending preferably downwardly into the shank portion 13 (see Fig. 4 also), these slots being for the purpose permitting a diametric compression of the head in order that a movable stop member or block 20 may be fitted thereon and retained movably in assembled condition on the head by expansion of the head portions into substantially spheroidal bore 21 in the block as a result of the driving home of a taper pin 22 in bore 23 within the stop, there being a sufficient clearance between the expanded head portions and the bore 21 in the block to permit the latter to rock freely in an orbital or universal sense upon the head when the taper pin is full driven home, said block nevertheless being inseparable from the head so long as said pin is in place.

At least one edge portion 24 of the stopping member or block 20 is bevelled or relieved, as at 25, Fig. 3, so that said edge 24 projects horizontally for engagement with the work 11, it being important to observe that said engaging edge portion 24 is disposed below a horizontal center line through the head portion 15 with the result that a horizontal thrust of the work 11 against edge 24 tends to rock the block 20 in a downward direction, thereby preventing the work from lifting from the table, said relieved portion 25 of the block affording clearance for the latter, relative to the work, to rock in such manner.

In order to maintain the block 20, and hence the work-engaging edge portion 24, in a normal horizontal disposition for engagement with the work, there is provided on each stop 12 a resilient positioning means in the nature of a spider spring 28, Figs. 3 and 4, said spider having a central opening 29 fitting closely over the collar portion 16 on the head, said spider further having a plurality of spring arms 30 biased upwardly to engage and press against the underside of block 20 in a manner to maintain the latter substantially in the normal position shown in Fig. 3, said arms yielding, however, to permit rocking of the block 20 responsive to thrusts of the work, as aforesaid, the ends 31 of said spider arms being curved back to facilitate relative motion of the block and the spring arms.

Figure 6:
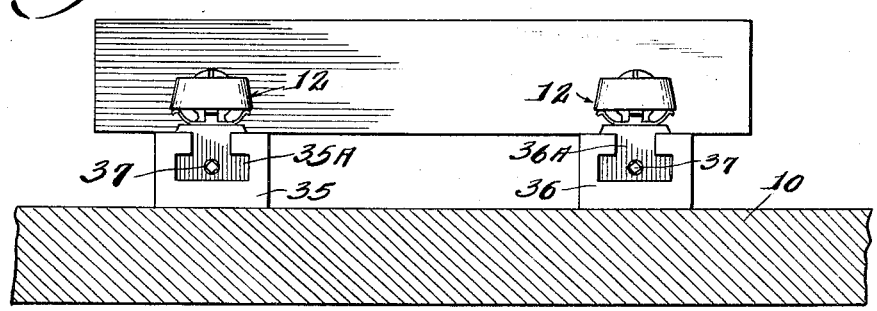
Fig. 6 is another elevational view similar to Fig. 5 but looking endwise at said parallels.

Parallels equipped with the novel stops are shown in Fig. 6, there being two parallel bars 35 and 36 disposed on the bed 10, and each bar having a slide portion 35A and 36A, respectively, keyed therein to slide longitudinally thereof, Seated in each slide member (or formed as an integral part thereof, if desired) is one of the stops 12 with engaging edges 24 disposed to bear against the work 11.

Figure 5:
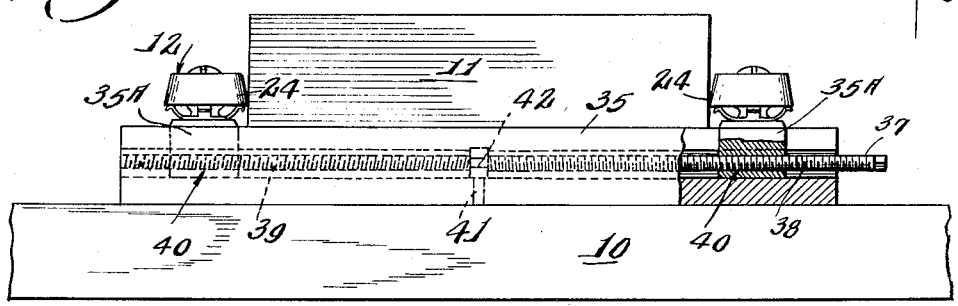
Fig. 5 is an elevational view, partly in section, of the novel stop applied to parallels on a work bed.

Each of the parallel bars, as shown in Fig. 5, is provided with a longitudinally extensive, screw-threaded adjusting rod 37 keyed at an end to receive a turning key or wrench, and having reversely threaded portions 38 and 39 threadably engaged in bores 40 of the slide members 35A and 36A, said rod being held stationary by set screw means 41 engaged in groove portions 42 of the rod at its middle, so that when said rod is turned, the slides 35A and 36A on the oppositely pitched or threaded portions 38 and 39 of the rods will be moved toward each other, in their respective parallel bars, to converge upon and grip the work 11, or to open away from the latter, depending upon the direction of rotation of said rods; preferably, clockwise rotation of said rods will effect a convergence of the stops upon the work, in the manner of jaws, and anticlockwise rotation of the rods will opens the stops apart to free the work.

Figure 7:
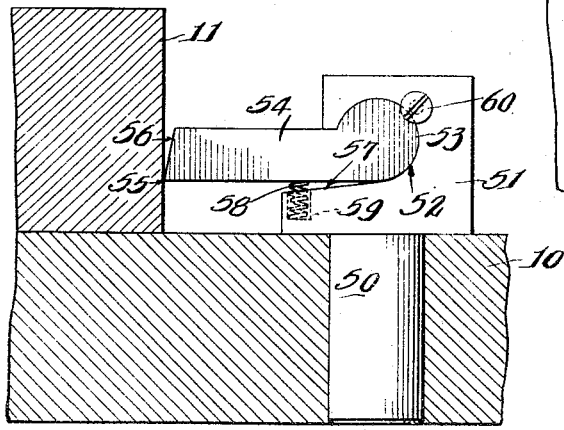
Fig. 7 is an elevational detail of a modified form of stop in operative position.

In Fig. 7 is shown a modified form of stop including a shank portion 50 surmounted by a block portion 51 adapted to seat upon the bed or table 10 and having a horizontally extensive bore 52 which is in part at least of cylindrical rondular or rotund contour to receive the cylindrical portion 53 of a work-engaging arm 54 projecting horizontally away from the block 51 toward the work 11, said arm having a work-engaging edge portion 55 analogous to the edge 24 of the device of Fig. 3, there being a sidewise opening projecting in a substantially radial sense from the cylindrical bore 52 in block 51, through which the arm portion 54 extends as aforesaid, and said block 51 being relieved or pitched as at 57 to permit rocking of the arm portion 54 in a vertical sense responsive to thrusts of the work 11 toward edge portion 55, portions of said block adjoining said work-engaging edge portion 55 being relieved, as at 56, to further permit such rocking movement, analogously to the operation of the device of Fig. 3.

Means including a spring 58, seated in a well 59 in block 51 and bearing up against the arm 54, normally positions the latter, and hence the work-engaging edge portion 55, for engagement with the work.

Figure 8:
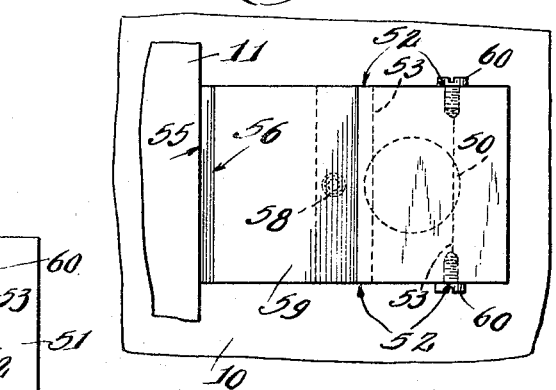
Fig. 8 is a top plan view of the device of Fig. 7.

In the modified embodiment of Figs. 7 and 8, the rockable member 53—54 is removably seated in the block 51, retaining screws 60 being threaded into the block on opposite sides thereof with portions of their respective heads overlying the cylindrical part 53 of the rockable arm or member to maintain the latter in its seat in the block; by removing one or both of these screws, the rockable member may be slid out of its seat for dressing of the edge portion 55, for example, or for replacement by an arm having a work-engaging edge 55 disposed at a different level, it being noted again that the edge portion 55 is disposed below a horizontal center line through the rocking axis of the arm 54, so that thrusts from the work tend to urge the latter downwardly upon the table, as in the operation of the embodiment of Figs. 1 through 3. Preferably, the work-engaging edges 24 and 55 of all embodiments are hardened, and for this additional reason it is desirable that the stop members be removable from their respective seats.

Having thus described my invention, what I claim is:

1. A work stop comprising a shank adapted to be received in a socket in a work bed, a head on said shank disposed above said bed when the shank is socketed therein, said head being of spherical contour and being slotted so as to be compressible in diametric size, a work-engaging member having a bore conforming substantially to said contour and being fitted upon said head to rock thereon, means received in a bore in said head, at least, to expand the head and retain said work-engaging member freely rockable thereon, said work-engaging member having a work-engaging edge disposed on that side of its rocking center which is toward said shank.

2. A work stop comprising a shank adapted to be seated in a work bed or the like, a bulbous head at one end of said shank, a bore extending through said head axially of said shank, slots in said head enabling force-fitting thereon of a work-engaging member, a work-engaging member of approximately rectangular shape having a bore conforming to said head and fitted on the latter to rock freely thereon, retaining means driven into said bore in the head to expand the same and prevent separation of the work-engaging member therefrom, a spring member fitted onto said stop between said head and shank and disposing said work-engaging member yieldably in an approximately normal plane to the axis of said shank for engagement with the work, at least one side portion of said work-engaging member sloping downwardly and outwardly from top to bottom thereof in the direction of said axis to provide a work-engaging edge which is disposed at a greater distance radially of said axis than adjoining portions of said side portion, said work-engaging edge being disposed at that side of the rocking center of the work-engaging member which is toward said shank.

3. A work stop including a member adapted to seat upon a work bed or the like, a work-engaging member having a rocking ball-and-socket interfitting connection with said first mentioned member, said connection constituting the means for supporting the work-engaging member above the level of said bed whereby said work-engaging member is rockable from any point around a circle in a direction generally toward and away from said bed, said work-engaging member having a radially outwardly projecting work-engaging edge portion disposed below a horizontal plane passing through the rocking center of the work-engaging member, whereby a work thrust against said edge portion and toward said first mentioned member tends to rock said work-engaging member toward said bed and maintain the work on the latter.

STANLEY H. HOLMES.

REFERENCES CITED

The following references are of record in the file of this patent:

UNITED STATES PATENTS

| Number | Name | Date |
|---|---|---|
| 78,620 | Swan | June 2, 1868 |
| 664,688 | Suess | Dec. 25, 1900 |
| 1,125,207 | Streeter | Jan. 19, 1915 |
| 1,242,182 | Hallas | Oct. 9, 1917 |
| 1,788,652 | Andrew et al. | Jan. 13, 1931 |
| 2,302,813 | Stuhlfauth et al. | Nov. 24, 1942 |
| 2,392,310 | Crestoff | Jan. 8, 1946 |

FOREIGN PATENTS

| Number | Country | Date |
|---|---|---|
| 3,723 | Great Britain | Feb. 15, 1904 |
| 230,138 | Great Britain | Mar. 9, 1925 |